United States Patent [19]

Matsui

[11] 3,901,486
[45] Aug. 26, 1975

[54] APPARATUS FOR MELTING RAW THERMOPLASTIC SYNTHETIC RESIN MATERIAL

[75] Inventor: Mitsuo Matsui, Ashikaga, Japan

[73] Assignee: Tokyo Tobari Co., Ltd., Tokyo, Japan

[22] Filed: Jan. 11, 1974

[21] Appl. No.: 432,539

[30] Foreign Application Priority Data
Apr. 20, 1973  Japan.......................... 48-47376[U]
Apr. 20, 1973  Japan.......................... 48-47377[U]

[52] U.S. Cl.............................. 259/191; 425/204
[51] Int. Cl.² ........................................ B29B 1/06
[58] Field of Search .......... 259/9, 10, 191; 425/204, 425/208

[56] References Cited
UNITED STATES PATENTS

| 2,662,243 | 12/1953 | Schnuck | 259/191 |
| 2,669,750 | 2/1954 | Keeney | 259/191 |
| 2,680,879 | 6/1954 | Schnuck | 259/191 |
| 3,123,860 | 3/1964 | Vesilind | 259/191 |
| 3,319,299 | 5/1967 | Kilray | 259/191 |
| 3,633,880 | 1/1972 | Newmark | 425/208 X |
| 3,687,423 | 8/1972 | Koch | 259/191 X |

Primary Examiner—Peter Feldman
Assistant Examiner—Alan Cantor
Attorney, Agent, or Firm—Cushman, Darby & Cushman

[57] ABSTRACT

An apparatus for melting raw thermoplastic synthetic resin material simply by applying mechanical friction heat without relying on any external heat source.

4 Claims, 7 Drawing Figures

3,901,486

APPARATUS FOR MELTING RAW THERMOPLASTIC SYNTHETIC RESIN MATERIAL

BACKGROUND OF THE INVENTION

This invention relates to an apparatus for melting raw thermoplastic synthetic resin material and more particularly to an apparatus for melting such plastic material simply by applying mechanical friction heat without using an external heat source such as electric power, gas, steam or hot oil.

Hitherto, thermoplastic synthetic resin product was manufactured by thermally melting the raw material, followed by molding. Therefore, such process required one type or another of thermally melting device based on an external heat source, consuming a large amount of fuel cost. Even the prior art process of melting raw synthetic resin material by mechanical friction heat as applied in this invention still required additional external heating means which gave rise to extra plant cost.

The present inventor has made studies to eliminate drawbacks accompanying the above-mentioned prior art melting processes, and invented an apparatus capable of fully melting thermoplastic synthetic resin material simply by mechanical friction heat without using any external heating device required for the prior art and, if necessary, concurrently acting as an extruder by being additionally fitted with a simple extruding means.

SUMMARY OF THE INVENTION

It is accordingly an object of this invention to provide an apparatus for melting thermoplastic synthetic resin material simply by mechanical friction heat without relying on any external heat source, which not only improves the melting operation but also has its construction prominently simplified due to the omission of said heat source.

Another object of this invention is to provide an apparatus for melting thermoplastic synthetic resin material which, if required, extrudes said resin material with a very strong force.

The first object of this invention is attained by providing an apparatus for melting thermoplastic synthetic resin material comprising a cylinder for melting raw thermoplastic synthetic resin material which horizontally projects outward from the body of the apparatus and has an inlet disposed inside of said body and an outlet positioned at the projecting end; and a screw rotatably inserted into the cylinder and provided on the peripheral surface with a helical groove so as to forcefully deliver by rotation the aforesaid thermoplastic synthetic resin material from the inlet to the outlet, characterized in that the screw consists of a section for preliminarily melting raw thermoplastic synthetic resin material in which those sides of the walls of the respective turns of the helical groove which face the extrusion side of the cylinder are gently inclined downward toward said extrusion side and those sides of the walls of the respective turns of the helical groove which face the inlet side of the cylinder are sharply inclined upward so as to cause the crest of each screw thread rotatably to slide along the inner walls of the cylinder; and a section for more thoroughly mixing, and extruding the preliminarily melted thermoplastic synthetic resin material in which the respective turns of the helical groove have a rectangular U-shaped cross section and the walls of said turns are provided with a plurality of crosswise notches at a proper interval so as to admit of the free passage of the raw material travelling through the adjacent turns of the helical groove.

The second object of this invention is attained by providing an apparatus for melting raw thermoplastic synthetic resin material comprising a cylinder for melting said raw material which horizontally projects outward from the body of the apparatus and has an inlet disposed inside of said body and an outlet positioned at the projecting end; a screw for preliminarily mixing and melting the raw material which is rotatably inserted into the cylinder and provided on the peripheral surface with a helical groove so as to forcefully deliver the raw material by rotation from the inlet to the outlet of the cylinder, said screw being so constructed that those sides of the walls of the respective turns of the helical groove which face the extrusion side of the cylinder are gently inclined downward toward said extrusion side and those sides of the walls of the respective turns of the helical groove which face the inlet side of the cylinder are sharply inclined upward so as to cause the crest of each screw thread rotatably to slide along the inner walls of the cylinder; and a rotatable member for more thoroughly mixing and melting the preliminarily melted raw material which is inserted into the cylinder for joint rotation with the screw, said rotatable member being so constructed that the peripheral surface of said rotatable member presents a continuous wavy cross section by the segmental portions of constituent rod-like blocks, that side of each wave crest which faces the rotating direction of the rotatable member is sharply inclined downward toward the root section, and each wave crest is so disposed as to slidably abut against the inner walls of the cylinder.

The last mentioned object of this invention is attained by providing an apparatus for melting raw thermoplastic synthetic resin material, wherein the screw or rotatable member is inserted into the cylinder with the outlet end face closely attached to the inner walls of the outlet end face of the cylinder; and the end face of said screw or rotatable member is provided with a plurality of extrusion grooves which are convergently curved from the periphery of said end face toward the center opposite to the rotating direction of the screw or rotatable member and progressively decrease in width and depth, namely in volume, and that side of each curved groove which is disposed opposite to the rotating direction is gently inclined upward so as to define a progressively widening opening, as viewed vertically as well as horizontally.

DETAILED DESCRIPTION OF THE PREFERRED EMBODIMENTS

Figure 1:
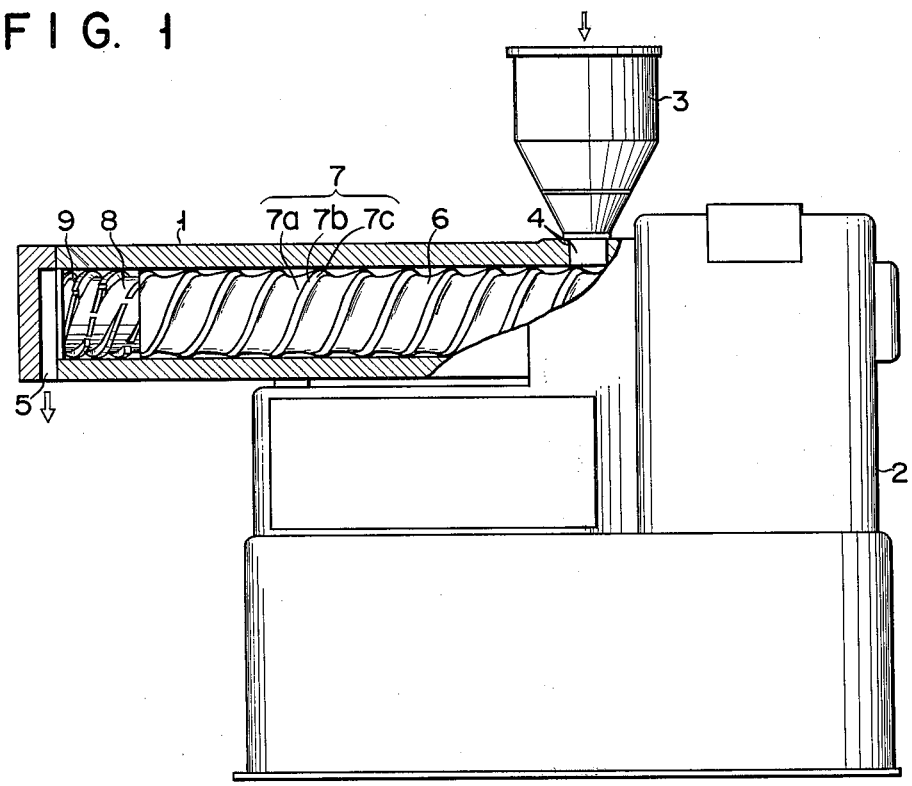
FIG. 1 is an elevational view, partly in section, of an apparatus according to an embodiment of this invention for melting raw thermoplastic synthetic resin material.

There will now be described by reference to FIG. 1 an apparatus according to a first embodiment of this invention for melting raw thermoplastic synthetic resin material. Referential numeral 1 denotes a cylinder for melting said synthetic resin material which is horizontally fitted to the body 2 of the subject apparatus. A hopper 3 is provided above one end of the cylinder 1. Formed at said end is an inlet 4 communicating with the hopper 3 so as to charge raw thermoplastic synthetic resin material (hereinafter simply referred to as "plastic material") into the cylinder 1. The opposite end of the cylinder 1 is provided with an outlet 5 of the plastic material. Referential numeral 6 shows a screw rotatably inserted into the cylinder 1 through one end. The screw 6 is interlocked with a drive means (not shown) received in the apparatus body 2. The screw 6 has its peripheral surface provided with a helical groove 7 extending from one end to the other. When the screw 6 is rotated in the prescribed direction, the helical groove 7 forcefully delivers the plastic material charged into the cylinder 1 through the inlet 4 continuously to the outlet 5. The plastic material carried forward through the helical groove 7 is melted by the heat generated by friction between the rotating screw threads and the inner wall of the cylinder 1. The groove 7 is constructed as shown in FIG. 1, namely, those sides 7a of the walls of the respective turns of the helical groove 7 which face the extrusion side of the cylinder 1 so as to forcefully deliver the plastic material to the outlet 5 are gently inclined upward toward the crests 7b of the respective screw threads slidably abutting against the inner wall of the cylinder 1, thus concurrently forming the bottom plane of the helical groove 7. The opposite sides 7c of the walls of the respective turns of the helical groove 7 which face the inlet side of the cylinder 1 are sharply inclined downward from the crests 7b toward the root section. Thus the sharply inclined side 7c on one of the walls of each turn of the helical groove 7 and the gently inclined side 7a on the other of said walls jointly define a hollow space whose cross section presents a Scalene triangle. Referential numeral 8 denotes a helical plastic material-extruding groove formed on the peripheral surface of the extrusion section of the screw 6 which is connected to the forward end of the first mentioned helical groove 7 and has a rectangular U-shaped cross section as is well known. The walls of the respective turns of said helical extrusion groove 8 are each provided with a plurality of crosswise notches at a proper interval so as to admit of the free passage of plastic material traveling through the adjacent turns of said helical extrusion groove 8, thereby effecting the better mixing of the plastic material.

There will now be described the operation of an apparatus according to a first embodiment of this invention for melting plastic material by friction heat. First, raw plastic material is charged into the hopper 3. Under this condition, the screw 6 is rotated by a drive means (not shown), causing the aforesaid two types of helical grooves 7, 8 formed on the peripheral surface of the screw 6 to be turned. As the result, the plastic material held in the hopper 3 is brought into the cylinder 1 through the inlet 4 first along the melting groove 7. The plastic material is forcefully conducted toward the extrusion side of the cylinder 1 while being pressed against the gently upwardly inclined side 7a of the walls of the respective turns of the helical groove 7. Accordingly, the plastic material is forced to the crest 7b of said gently upwardly inclined side 7a, and then into a very narrow space between the crest 7b and the inner wall of the cylinder 1. While passing through the very narrow space, the plastic material is crushed and also melted by heat generated by friction between the crest 7b and the inner wall of the cylinder 1. The plastic material which is conducted onward while being melted is brought into the helical extrusion groove 8 and finally extruded to the outside at the outlet 5 of the cylinder 1 after passing through said groove 8 or the notches 9 provided in the walls thereof. Before extruded to the outside, the plastic material is more thoroughly mixed by passing through the notches 9.

As mentioned above, the plastic material is crushed while being moved along the upward gently inclined sides of the walls of the respective turns of the helical melting groove 7 toward the rising section or the crest 7b and then into a very narrow space between the crest 7b and the inner wall of the cylinder 1 and also well melted by friction heat generated in said space. The smooth travel of the plastic material melted simply by the drive of the screw to the extrusion side of the cylinder 1 eliminates the necessity of applying any other, for example, electric heat source, thus providing an inexpensive melting apparatus of simple construction and very great practical use.

There will now be described by reference to FIGS. 2 to 4 the operation of an apparatus according to a second embodiment of this invention for melting plastic material. Referential numeral 1 denotes a melting cylinder horizontally fitted to the body 2 of the apparatus. The cylinder 1 is provided at one end with an inlet of plastic material communicating with a hopper 3 disposed above. The head 1a of the cylinder 1 is partly cut off to form an outlet 5. Referential numeral 16 shows a screw inserted into the cylinder through the inlet side, and rotated by being fitted to a shaft 20 rotating with a drive means (not shown) received in the apparatus body 2. The screw 16 has its peripheral surface provided with a helical groove 17 constructed substantially in the same way as in FIG. 1, excepting that the respective turns of the helical groove 17 progressively decrease in depth toward the extrusion side of the cylinder 1. The rotation of the screw 16 causes the plastic material held in the hopper 3 to be introduced into the cylinder 1 through the inlet 4 and forcefully conducted to the outlet 5. Referential numeral 10 is a rotatable member disposed near the inlet 5 of the cylinder and so fitted as to surround the peripheral surface of the shaft 20 and be connected with the forward end of the screw 16 for joint rotation therewith. The rotatable member 10 consists of a plurality of rod-like blocks 21 arranged around the periphery of the shaft 20 as shown in FIGS. 3 and 4. The interspaces between the respective rodlike blocks 21 are fitted with a welding material or a filler so as to securely set the blocks 21 in place. (It is also possible to manufacture the rotatable member 10 by forming the rod-like blocks 21 and intervening filler into an integral body initially from the same material.)

The peripheral surface of the rotatable member 10 presents a continuous wavy cross section by the segmental portions of the constituent rod-like blocks. The crest 22 of each wave is raised highest at the center so as to slidably abut against the inner wall of the cylinder 1 and both sides 23 are gently inclined downward toward the center 24 of the root section. The grooves 25 jointly defined by the inner wall of the cylinder 1, both sides 24 of the respective crests 22 and the welding material filled between the adjacent rod-like blocks 21 have the same number as that of the respective turns of the helical groove 17 appearing on the cross sectional plane of the screw 16. The grooves 25 between the adjacent rod-like blocks 21 communicate at the inner end with the openings of the respective turns of the helical groove 17 and one open at the outer end to the cylinder head 1a for communication with the outlet 5.

There will now be described the operation of an apparatus according to the second embodiment of this invention for melting plastic material. The drive means rotates the shaft 20 and in consequence the screw 16 and rotatable member 10. The rotation of the screw 16 causes the plastic material held in the hopper 3 to be charged into the cylinder 1 through the inlet 4 along the helical groove 17 of the screw 16. The plastic material is forcefully conducted through the helical groove 17 to the extrusion side of the cylinder 1 while being pressed against the upward gently inclined side 17a of the screw threads of the respective turns of the helical groove 17. While passing through a very narrow space between the crests 17b of said screw threads and the inner wall of the cylinder 1, the plastic material is crushed and also melted by friction heat generated in siad narrow space. Since the bottom planes of the respective turns of the helical groove 17 progressively decreased in depth toward the extrusion side of the cylinder 1, the plastic material is subjected to higher pressure as it travels forward through the helical groove 17 so as to be more thoroughly mixed. The plastic material is transferred from the forward openings of the respective turns of the helical groove 17 into the grooves 25 jointly defined by the inner wall of the cylinder 1, both walls 23 of the respective crests 22 and the welding material filled between the adjacent rod-like blocks 21 of the rotatable member 10 and further conducted to the extrusion side of the cylinder 1. At this time, the plastic material is again forced into a very narrow space between the inner wall of the cylinder 1 and the crests 22 of the wavy peripheral outline of the rotatable member 10 after moving along the upward gently inclined sides 23 of the crests 22 to be more thoroughly mixed and melted by friction heat generated in said narrow space. The molten plastic material flows from the forward openings of the grooves 25 to the outlet 5 of the cylinder 1 to be extruded to the outside.

Figure 2:
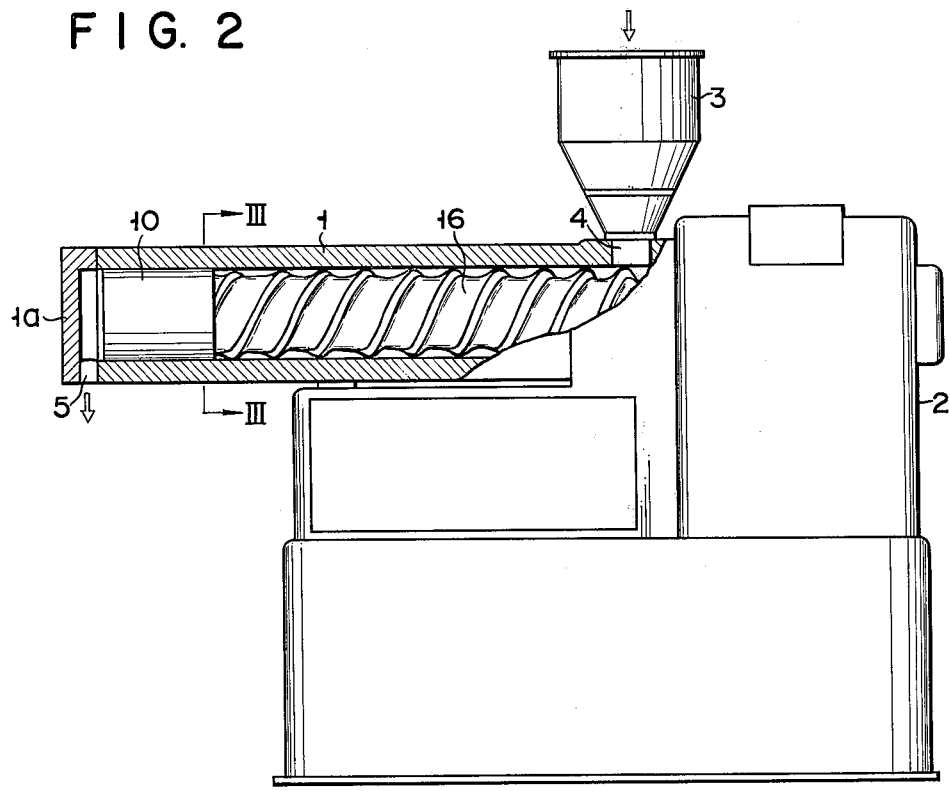
FIG. 2 is an elevational view, partly in section, of an apparatus according to another embodiment of the invention for melting raw thermoplastic synthetic resin material.
Figure 3:
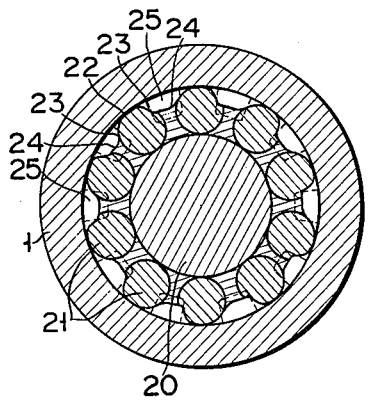
FIG. 3 is an enlarged fractional cross sectional view on line III—III of FIG. 2.
Figure 4:
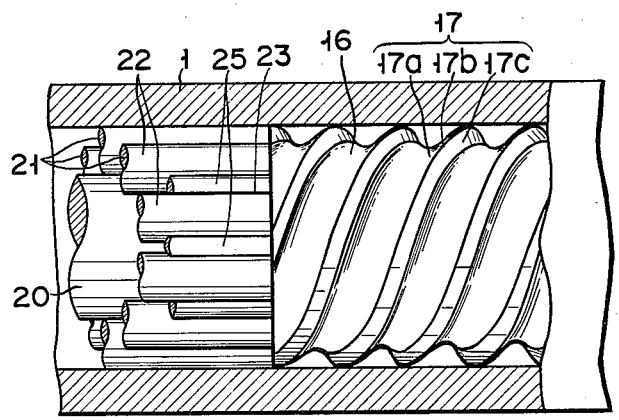
FIG. 4 is an enlarged fractional elevational view of FIG. 2, partly in section.

According to the second embodiment of FIGS. 2, 3 and 4, the peripheral surface of the rotatable member 10 presented a continuous wavy cross section by the segmental portions of the constituent rod-like blocks 21. However, both sides 23 of the crests 22 of said wavy outline may take the V-shape, provided said sides do not rise vertically at right angles to the inner wall of the cylinder 1, but are gently inclined downward toward the root section 24. Further, the upward gently inclined plane 23 may be formed only on one side of the crest 22 facing the rotating direction of the rotatable member 10.

According to the second embodiment, the plastic material preliminarily melted by the rotation of the screw 16 is more thoroughly mixed and melted by being forced into a very narrow space defined between the inner wall of the cylinder 1 and the crests 22 of the wavy peripheral outline of the rotatable member 10 and also exposed to friction heat generated in said narrow space.

Figure 5:
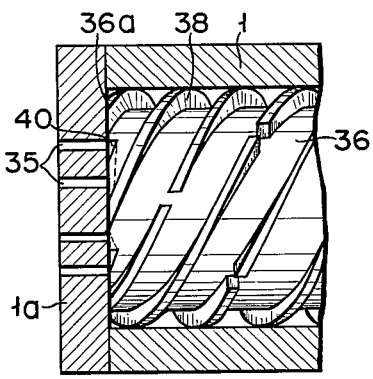
FIG. 5 is a fractional elevational view, partly in section, of a third embodiment of the invention which is designed to extrude molten thermoplastic synthetic resin material with a greater force.
Figure 6:
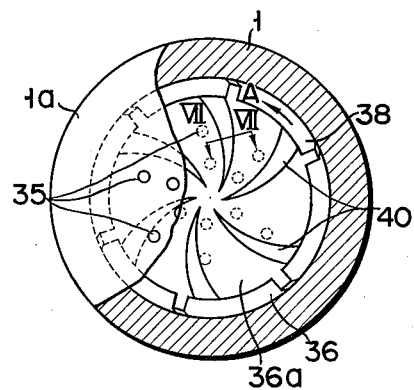
FIG. 6 is a fractional cross sectional view of FIG. 5, partly in section.
Figure 7:
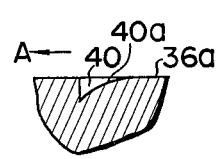
FIG. 7 is a cross sectional view on line VII—VII of FIG. 6.

There will now be described by reference to FIGS. 5, 6 and 7 an apparatus according to a third embodiment of this invention for melting plastic material which is designed to extrude the molten plastic material with a far greater force. The main parts of the melting apparatus according to this third embodiment are the same as those of FIG. 1, description thereof being omitted. Reference is now made only to the extruding section by reference to the enlarged views (FIGS. 5, 6, 7) thereof. FIG. 5 is a fractional elevational view, partly in section, of the extrusion side of the cylinder 1. FIG. 6 is a fractional cross sectional view of FIG. 5, partly in section. FIG. 7 is a cross sectional view on line VII—VII of FIG. 6. The forward end face 36a of the screw 36 has a plurality of extrusion grooves 40 arranged substantially in the radial direction. These extrusion grooves 40 are curved opposite to the rotating direction A of the screw 36 and convergently extend from the periphery to the center thereof. That end of the extrusion groove 40 which faces the periphery of the screw 36 communicates with one end of a guide groove 38 having a substantially U-shaped cross section to admit of the easy introduction of the plastic material through said guide groove 38. The extrusion groove 40 progressively decreases in both width and depth, namely, in volume toward the center of the screw 36. That side 40a of the groove 40 which is disposed opposite to the rotating direction A of the screw 36 does not rise at right angles to the upper plane of the groove 40, but is gently inclined upward so as to concurrently form a gradually widening opening. The plastic material brought into the extrusion groove 40 which is curved opposite to the rotating direction of the screw 36 is forced into the end portion of the extrusion groove 40 which is far more reduced in volume than the other portions thereof and consequently subjected to a higher pressure. Since, as mentioned above, one side of the extrusion groove 40 is gently inclined upward to from a widening opening, the plastic material is extruded through the outlet 35 of the cylinder 1 not only by the aforesaid pressure but also by a force with which the plastic material is pressed as if by a spatula. In this case, the plastic material is discharged smoothly and unfailingly even without increasing the rotating speed of the screw 36. The extruding mechanism according to the third embodiment of this invention which is constructed as described above enables the molten plastic material to be immediately molded in the succeeding step. Said extruding mechanism is also applicable to the second embodiment described by reference to FIGS. 2 to 4.

What is claimed is:

1. An apparatus for melting raw material of thermoplastic synthetic resin comprising a cylinder for melting said raw material which is fitted to the body of the apparatus so as to project horizontally and has an inlet at the side of the apparatus body and an outlet at the projecting end, and a screw rotatably inserted into the cylinder and provided on the outer peripheral surface with helical grooves for forcibly delivering by rotation said raw material from the inlet to the outlet of the cylinder, wherein the forward end face of the screw closely abuts against the inner wall of the forward end face of the cylinder and is provided with a plurality of extrusion grooves progressively decreasing in cross-sectional area toward the center of the end face of the screw and convergently curved from the periphery to the center of the end face of the screw in a direction opposite to the rotating direction of the screw, and those sides of said extrusion grooves which are directed in the rotating direction of the screw are gently inclined upward so as to form gradually upwardly widening openings.

2. An apparatus for melting raw material of thermoplastic synthetic resin according to claim 1, wherein those sides of the walls of the respective turns of the helical grooves which are directed toward the outlet end of the cylinder are gently inclined up toward the inner wall of the cylinder.

3. An apparatus for melting raw material of the thermoplastic synthetic resin according to claim 1, wherein said screw consists of a section for melting said raw material in which those sides of the walls of the respective turns of the helical grooves which are directed toward the outlet end of the cylinder are gently inclined up toward the inner wall of the cylinder and of another section for more thoroughly mixing and extruding the melted material in which the respective turns of the helical grooves continuously connected with those of the helical grooves of said section for melting said raw material have a substantially U-shaped cross section; and the walls of the respective turns of the helical grooves of said another section are provided with a plurality of notches crosswise arranged at proper intervals so as to admit said raw material traveling through the two adjacent turns to pass freely therethrough, thereby attaining the full mixing of said raw material.

4. An apparatus for melting raw material of thermoplastic synthetic resin according to claim 1, wherein said screw acting as a section for mixing and melting said raw material is so constructed that those sides of the walls of the respective turns of the helical grooves which are directed toward the extrusion side outlet end of the cylinder are gently inclined up toward the inner wall of the cylinder; a rotatable member acting as a section for more thoroughly mixing and melting the melted raw material is inserted into the cylinder to rotate with the screw and is so constructed that the outer peripheral surface of the rotatable member presents a continuous wavy configuration in cross section of rod-like blocks constituting said member; and crests of said wavy peripheral configuration are so disposed as to rotatably slide on the inner wall of the cylinder, and grooves between the adjacent rod-like blocks are connected with the helical grooves of the screw.

* * * * *